R. J. TALLEY.
Grub-Plow and Stalk-Cutter.

No. 211,433. Patented Jan. 14, 1879.

Witnesses,
W. A. Betram
D. L. U. Barclay

Inventor
R. J. Talley
by
R. D. Williams
Attorney.

UNITED STATES PATENT OFFICE.

REUBEN J. TALLEY, OF HARRISVILLE, TEXAS.

IMPROVEMENT IN GRUB-PLOW AND STALK-CUTTER.

Specification forming part of Letters Patent No. 211,433, dated January 14, 1879; application filed November 12, 1878.

*To all whom it may concern:*

Be it known that I, REUBEN J. TALLEY, of Harrisville, Bell county, State of Texas, have invented certain new and useful Improvements in Grub-Plow and Stalk-Cutter; and I hereby declare the same to be fully, clearly, and exactly described as follows, reference being had to the accompanying drawings, in which—

Figure 1:
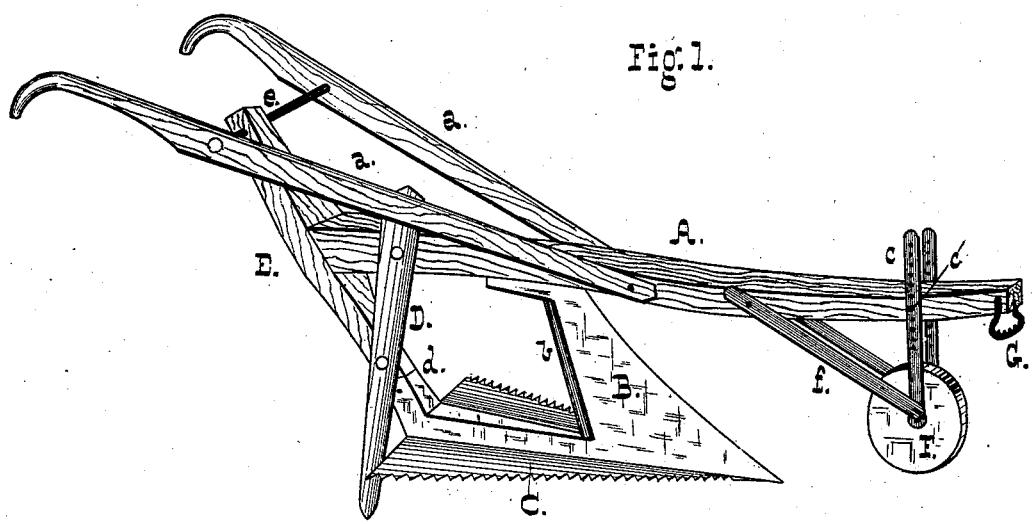
Figure 2:
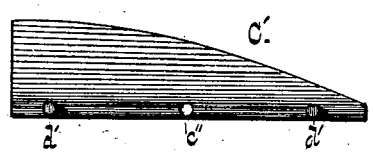

Figure 1 is a perspective view of the device; Fig. 2, a plan view of the removable cutter.

This invention relates to that class of devices in use for removing grubs from the land; and it consists in a device for accomplishing that end, constructed as hereinafter described, and possessing points of novelty indicated in the claim.

In the accompanying drawings, A is the plow-beam, having a clevis, G, of ordinary or appropriate construction, and handles $a\ a$, also of the usual form. B is a vertical cutter, preferably of chilled iron, attached by means of a bolt-rod, $b$, to the beam A. This bolt serves also to secure the saw C or cutter C', which are furnished with a pair of pins, $d'$, (see Fig. 2,) which enter holes in the base of the cutter B, the bolt-rod $b$ being made to pass through the hole $c''$. As an alternative for the pins $d'$, the cutter or saw is furnished with a dovetail rib or slot, adapted to engage with a correspondingly-formed slot or rib on the cutter-base B. E is the rear beam, through which passes the bar $e$, connecting the handles $a$, and is stepped and secured in a socket, $d$, in the base of the cutter B. D is the colter, secured at the rear of the saw or cutter, and attached by bolts to the beams A and E.

F is the gage-wheel, which is pivoted to arms $f$, that in turn are pivoted to the beam A, and is made vertically adjustable through the medium of the perforated bars $c$ and pin $c'$, engaging with a hole in the beam A.

The operation of the device is as follows: The gage-wheel F being adjusted to the desired depth, the device is drawn over the land, the saw C serving alike as a subsoiler and to sever all roots and grubs. The broad vertical cutter B and colter D effectually prevent the device from being driven laterally as it encounters the grubs or roots.

In cutting cotton-stalks the saw is unnecessary, and the cutter C' is substituted for it, as hereinbefore explained.

Having thus described my invention, what I claim as new, and desire to secure by Letters Patent, is—

In a grub-plow, the saw C, in combination with the cutter B and colter D, substantially as shown and described.

Witness my hand this 5th day of November, 1878.

REUBEN JONES TALLEY.

Witnesses:
W. G. W. STONE,
W. R. ARMSTRONG.